United States Patent [19]

Homfeldt

[11] Patent Number: 4,486,930
[45] Date of Patent: Dec. 11, 1984

[54] CUT-OFF FOR CLINCH NUT FEED

[75] Inventor: Kent D. Homfeldt, Elgin, Ill.

[73] Assignee: Illinois Tool Works Inc., Chicago, Ill.

[21] Appl. No.: 436,559

[22] Filed: Oct. 25, 1982

[51] Int. Cl.³ .................. B23P 11/00; F16B 39/282
[52] U.S. Cl. .................................. 29/33 K; 29/509;
29/522 R; 29/523; 411/179
[58] Field of Search .................. 29/503, 522 R, 523,
29/33 K, 818; 411/183, 181, 180, 179, 177

[56] References Cited

U.S. PATENT DOCUMENTS 3,845,860 11/1974 Ladouceur et al. ............ 411/179 X
3,923,089 12/1975 Ladouceur ..................... 411/179

FOREIGN PATENT DOCUMENTS 510001 10/1930 Fed. Rep. of Germany ........ 29/509

Primary Examiner—Z. R. Bilinsky
Attorney, Agent, or Firm—David I. Roche; Thomas W. Buckman

[57] ABSTRACT

An apparatus for severing a lead nut from a linear arrangement of attached nuts and for securing such a lead nut to carrier material is disclosed. The apparatus comprises a punch operated by a ram and disposed within a stripper, and a die disposed within a nut guide and secured to a fixed base. The punch is spring biased within the stripper and is oriented towards the die in such a manner that advancement of the punch toward the die also advances the punch tip towards the die cavity. The nut guide is spring biased away from the base. The nut guide includes two interconnecting passageways, one passageway being laterally disposed toward the other. An arrangement of attached nuts is advanceable, within the first nut guide passageway, toward the die surface. The carrier material is supported upon an upper surface of the nut guide, being interposed between the punch and the die. From a starting position, the ram advances the punch and stripper, as a unit, toward the die causing the stripper to engage the carrier material urging the nut guide downwardly toward the base severing the lead nut from the remainder of the attached nuts. Downward motion of the punch, relative to the die, causes the punch tip to puncture the carrier material drawing portions of the carrier material into the lead nut hole and securing the lead nut to the carrier material.

6 Claims, 19 Drawing Figures

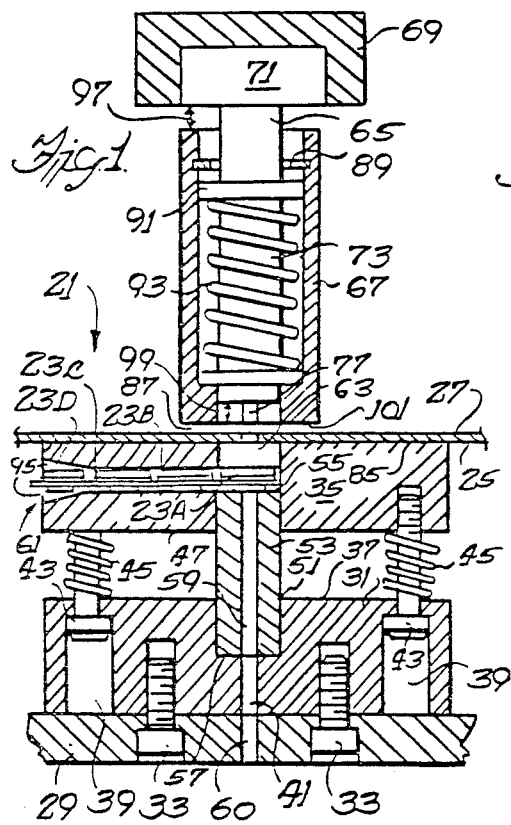
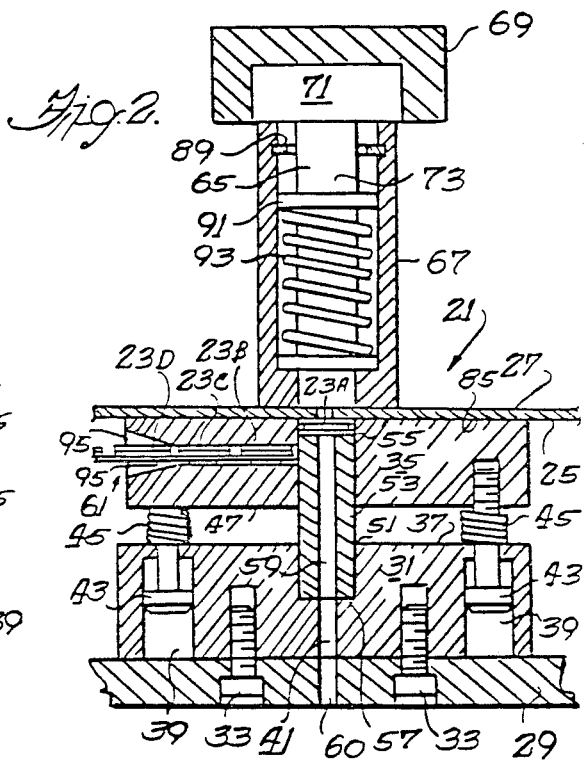
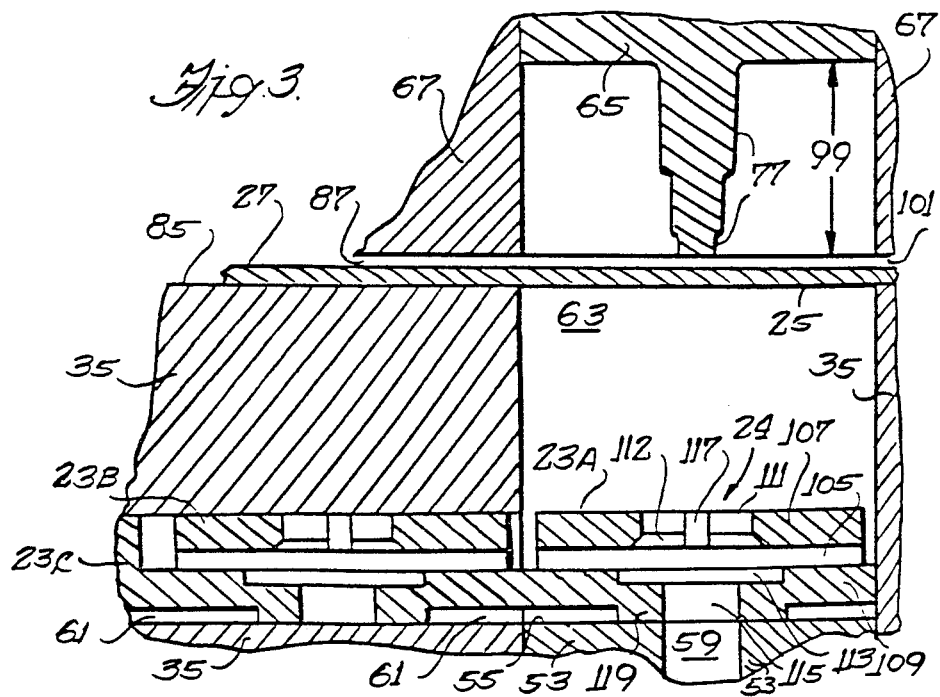

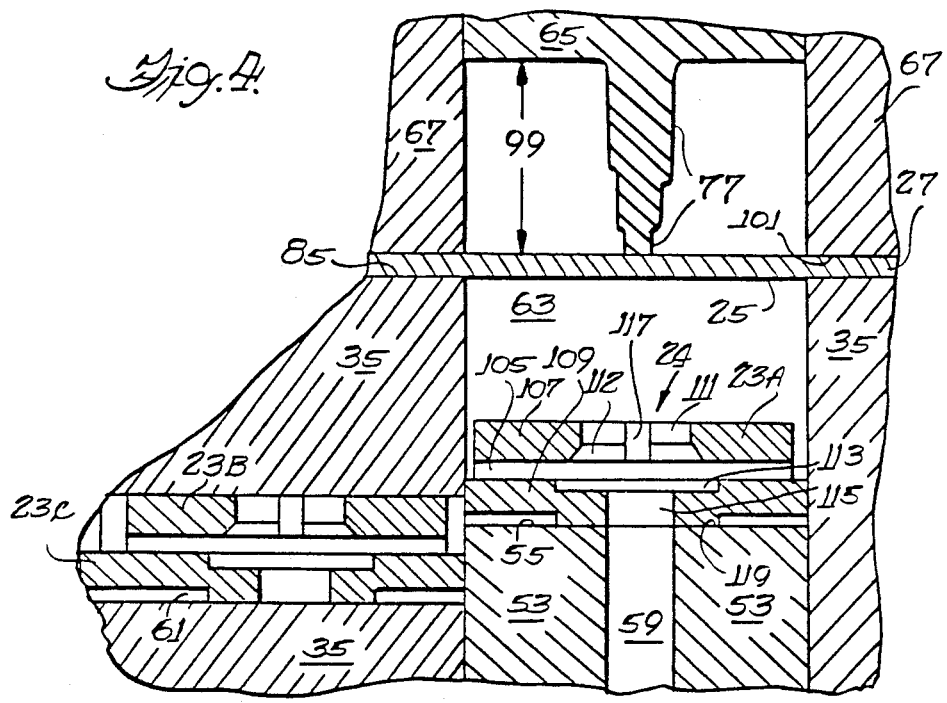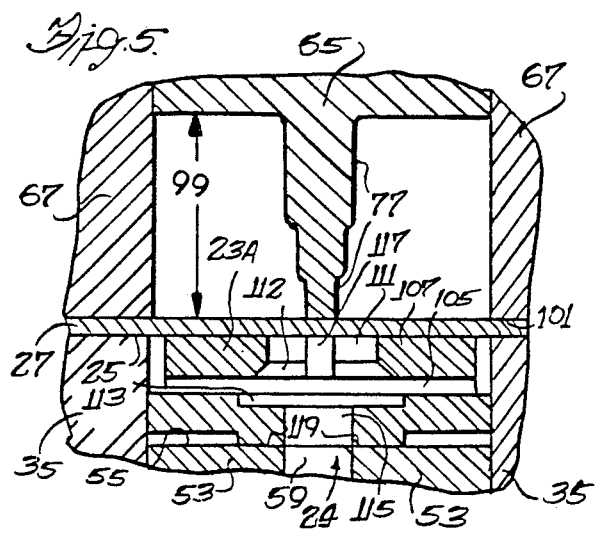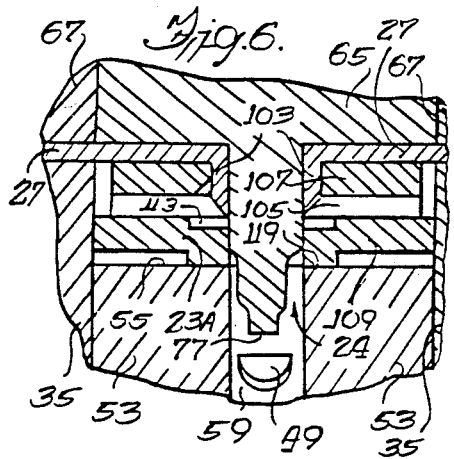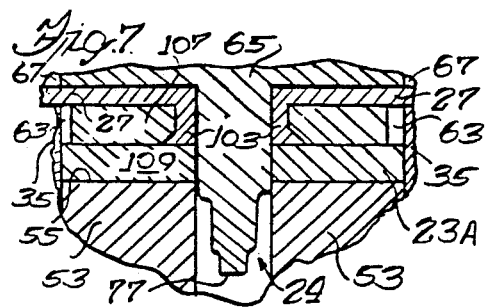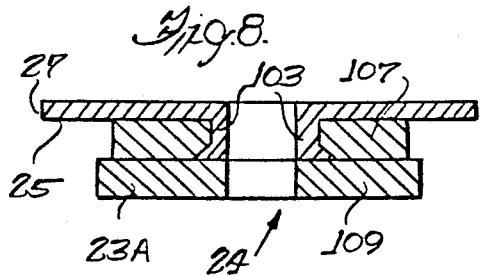

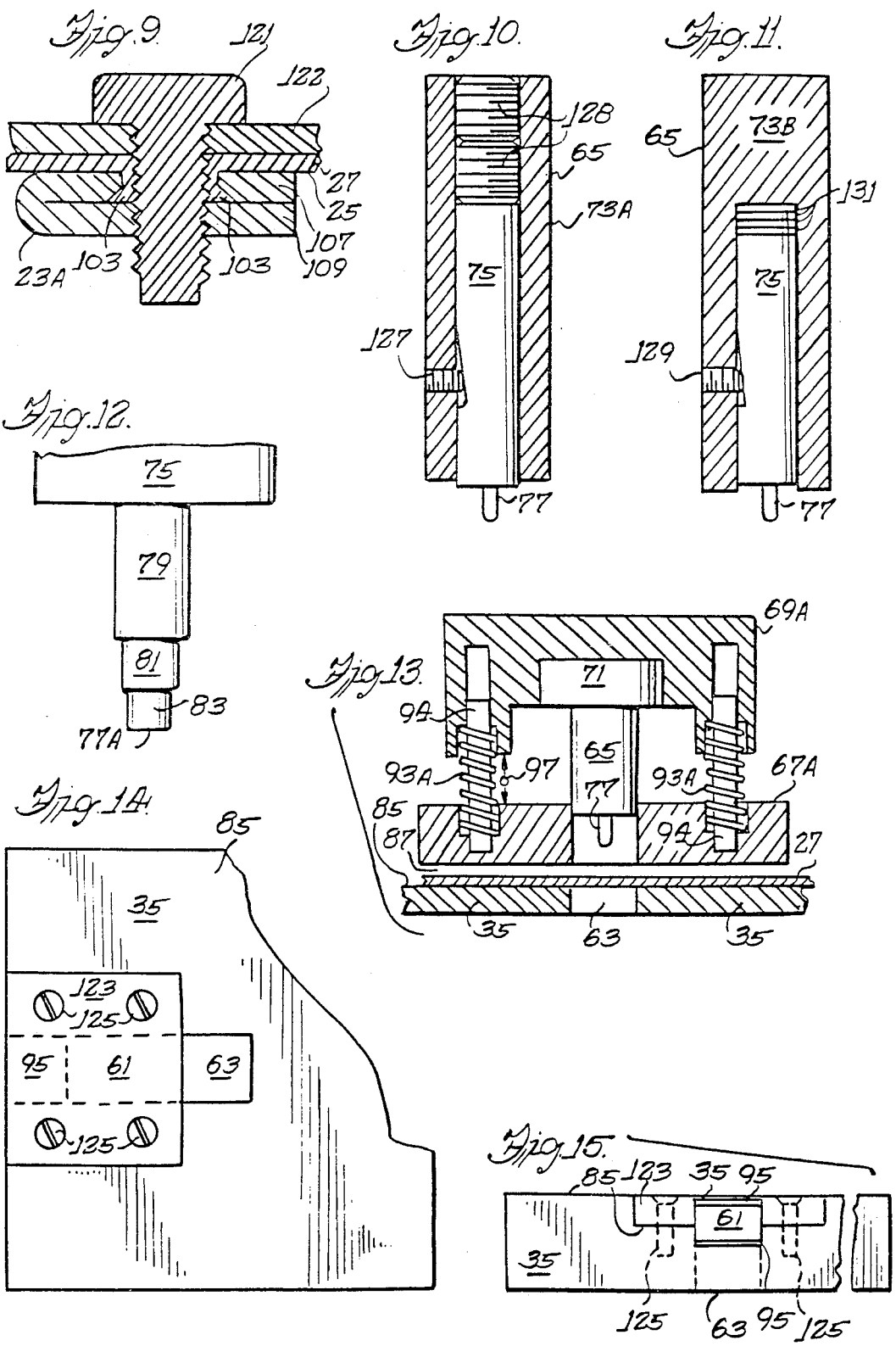

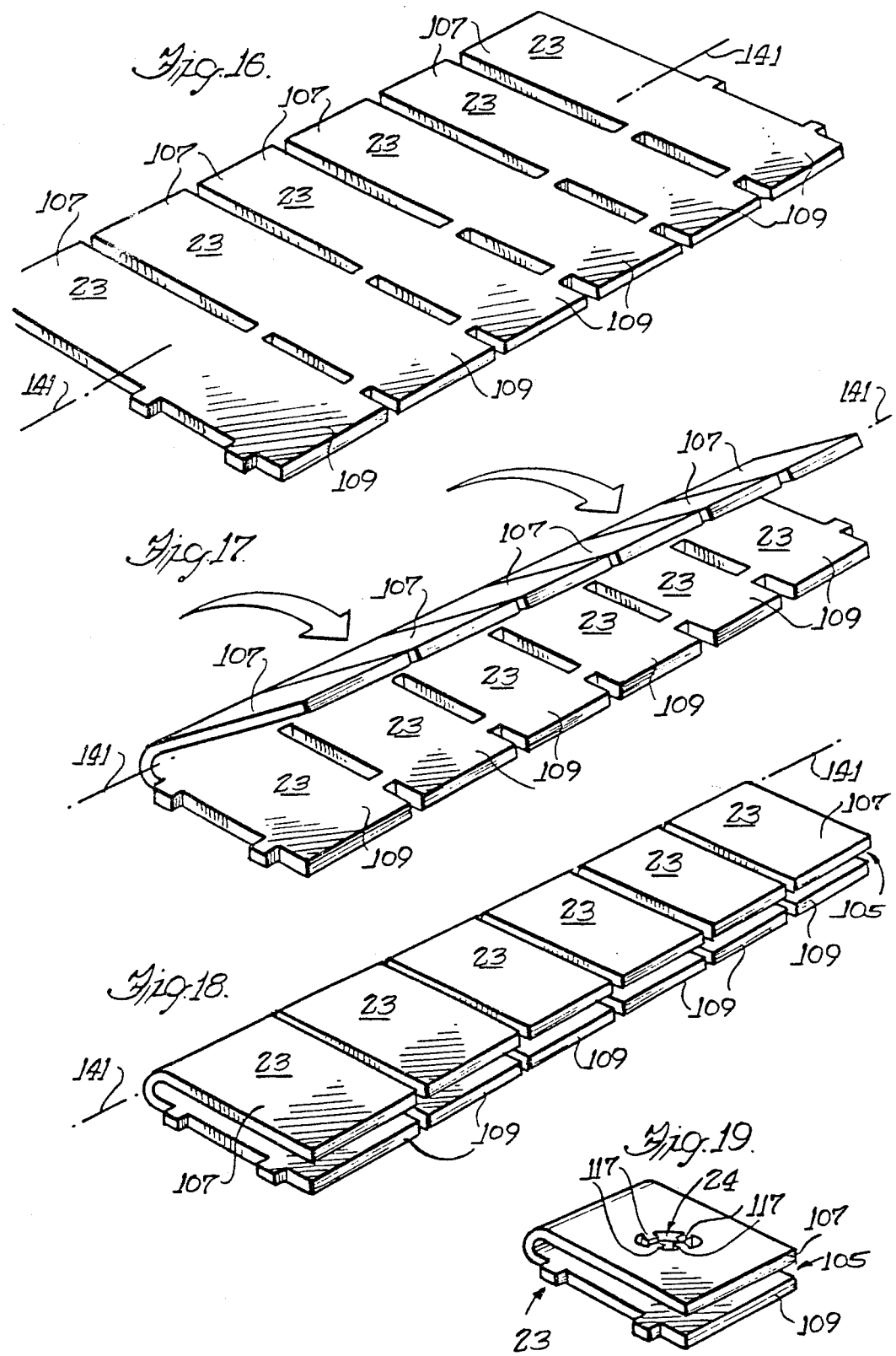

CUT-OFF FOR CLINCH NUT FEED

BACKGROUND OF THE INVENTION

The present application is directed to nuts which are designed to be clinched by or otherwise secured to carrier material, such as a panel. In the art, such nuts are referred to as "clinch nuts". More particularly, this invention is directed to an apparatus for severing a lead nut from a plurality of attached nuts and for securing such a lead nut to carrier material.

For efficient manufacture, for ease of handling or for other reasons, nuts which are to be secured to carrier material often are attached to each other in a linear arrangement, which often can become quite lengthy. For ease of handling or for other reasons, a lengthy arrangement of attached nuts is occasionally wound onto a spool or otherwise arranged in a coil-like fashion.

It is desirable to have an apparatus which incorporates, in a single action, the severing of a lead nut from a linear-arrangement of attached nuts and the securing of such a lead nut to carrier material.

OBJECT AND SUMMARY OF THE INVENTION

Accordingly, it is a general object of this invention to provide an apparatus which severs a lead nut from an arrangement of attached nuts and secures such a severed lead nut to carrier material in a one-step procedure.

Briefly, and in accordance with the foregoing object, an apparatus, according to the present invention, comprises a punch operated by a ram and disposed within a stripper, and a die disposed within a nut guide and secured to a fixed base. An end of the punch includes a punch tip. The die contains a die cavity and has an upper surface which is oriented toward the punch. The punch is spring biased within the stripper and is oriented toward the upper surface of the die in a manner such that advancement of the punch toward the die also advances the punch tip toward the die cavity. The nut guide is spring biased away from the base. The nut guide includes at least two interconnecting cavities, one cavity being laterally disposed toward the other. A linear arrangement of attached nuts is advanceable, within the first nut guide cavity, toward the die surface. The height of the first nut guide cavity is slightly greater than the height dimension of an individual nut. Each nut includes a substantially centrally disposed hole therethrough. With the die disposed within the second nut guide cavity, the nut guide is advanceable toward the base.

The above-described elements of the apparatus cooperate to sever a lead nut from the linear arrangement and to secure such a lead nut to carrier material as follows: the carrier material is supportable upon an upper surface of the nut guide and thus is interposable between the punch and the die. From a starting position, the ram advances the punch and stripper, as a unit, toward the die. Such advancement initially causes the stripper to urge the carrier material, which is supported upon an upper surface of the nut guide, and the nut guide downwardly toward the base. The die surface supports the lead nut; and downward motion of the nut guide, relative to the die now disposed within the second nut guide cavity, severs the lead nut from the remainder of the arrangement of attached nuts. Downward movement of the punch and stripper, as a unit, relative to the die, continues until an upper surface of the lead nut engages a lower surface of the carrier material. Downward movement of the stripper, relative to the die, then ceases; and downward motion of the punch, relative to the die, causes the punch tip to pierce the carrier material forcibly drawing portions of such carrier material into the lead nut hole and securing the lead nut to the carrier material. Thereafter, the punch and stripper are moved upwardly and away from the secured lead nut, back to the starting position; and the carrier material is either advanced along or is removed from the upper surface of the nut guide so as to lift the secured lead nut out of the second nut guide cavity. The arrangement of attached nuts is then advanced within the first nut guide cavity thereby placing another lead nut onto the die surface, and the above-described procedure is repeated.

BRIEF DESCRIPTION OF THE DRAWINGS

The foregoing, as well as other objects, features and advantages of the present invention will become more readily understood upon reading the following detailed description of the illustrated embodiments, together with reference to the drawings, wherein:

FIG. 1 presents in side view, partially in section, one embodiment of an apparatus, the view presenting relative arrangement of various elements of the apparatus (in a starting position), in accordance with the present invention;

FIG. 2 presents a later sequence of the elements of the apparatus presented in FIG. 1;

FIG. 3 presents in side view, on an enlarged scale, relative arrangement of some of the elements presented in FIG. 1;

FIG. 4 presents (on an enlarged scale) downward advancement of the stripper and punch, as a unit, relative to the die and lead nut, thereby causing severing of the lead nut from the remainder of the attached nuts;

FIG. 5 presents (on an enlarged scale) relative arrangement of some of the elements presented in FIG. 1 when downward motion of the stripper and punch, relative to the die, causes the upper surface of the lead nut to come into contact with the lower surface of the carrier material;

FIG. 6 presents a later sequence of the elements presented in FIG. 5, such contact causing downward motion of the stripper, relative to the die, to cease; FIG. 6 presents advancement of the punch (only) relative to the die, puncture of the carrier material by the punch tip, and insertion of the punch tip into the nut hole causing portions of the carrier material to be drawn into the nut hole;

FIG. 7 presents further advancement of the punch, relative to the die, partial collapse or deformation of certain portions of the nut structure and securement of the nut to the carrier material;

FIG. 8 presents a side view, in section, of the nut as secured to (or as clinched by) the carrier material, the clinched nut having been removed from the apparatus;

FIG. 9 presents a side view, in section, of the clinch nut of FIG. 8 (rotated about 90° about the axis of the nut hole and) bolted to a panel portion of a fixed or movable structure;

FIG. 10 presents a side view, partially in section, of one embodiment of the punch including a punch element disposed within a punch body, secured by a laterally disposed set screw to the punch body, the punch element being advanceable or retractable, relative to the punch body, by means of two set screws screwed into the punch body opposite the punch element tip;

FIG. 11 presents a side view, in section, of another embodiment of the punch including the punch element disposed into a cavity of a second punch body, the punch element being retained therein by a second laterally disposed set screw, the view presenting interposition of four shims between a base of the punch body cavity and the end of the punch element opposite the punch element tip;

FIG. 12 presents, in side view, on an enlarged scale, one preferred embodiment of a punch element tip;

FIG. 13 presents an end view, partially in section, of a second embodiment of a punch-and-stripper assembly, in accordance with the present invention;

FIG. 14 presents a top view (on an enlarged scale) of a preferred embodiment of the nut guide;

FIG. 15 presents an end view of the preferred embodiment of the nut guide presented in FIG. 14, in accordance with the present invention;

FIG. 16 presents a perspective view of a linear arrangement of attached clinch nuts (on an enlarged scale) prior to bending;

FIG. 17 presents the linear arrangement of FIG. 16, in perspective, during bending;

FIG. 18 presents the linear arrangement of FIG. 16, in perspective, after bending; and, FIG. 19 presents, in perspective, an individual clinch nut.

DETAILED DESCRIPTION OF THE ILLUSTRATED EMBODIMENTS

Referring to the drawings, and initially to FIG. 1, cooperating elements of an apparatus 21 for severing a lead nut 23A from a linear arrangement of attached nuts 23A–23D and securing such a lead nut 23A to an underside 25 of a panel 27, will now be discussed.

An individual nut is generally referred to by the reference numeral 23 throughout this application (FIG. 19). Attached nuts are generally referred to by the reference numeral 23 and an appropriate capital letter designating linear order (e.g., nuts 23A–23D, FIGS. 1, 2).

Each nut 23 or 23A–23D includes a nut hole 24 (FIGS. 3–6, 8 and 19). The apparatus 21 includes a fixed base 29 (FIGS. 1, 2), and a keeper block 31 set upon the base 29 and secured thereto in a known manner by bolts 33.

The keeper block 31 supports a nut guide 35 which is spring biased away from the upper surface 37 of the keeper block 31. The keeper block 31 includes at least three bores 39, 41. Two of the bores 39 are disposed upwardly through the keeper block 31 so that bolts 43 and springs 45 can be used in a known manner to spring bias the bottom surface 47 of the nut guide 35 away from the upper surface 37 of the keeper block 31 (see FIGS. 1, 2). The third bore 41 of the keeper block 31 is included and oriented so that a slug portion 49 of the panel 27 (see FIG. 6) can easily drop from the apparatus 21 and thereafter be properly disposed of or otherwise used in an intended fashion.

Above the third bore 41, the keeper block 31 includes a cavity 51 in which is disposed a die 53 (FIGS. 1, 2). The die 53 includes an upper surface 55 (FIGS. 1–7), a lower surface 57 (FIGS. 1, 2) and a bore 59 which passes through the die 53, from the upper surface 55 to the lower surface 57. The bore 59 of the die 53 aligns with the third bore 41 of the keeper block 31.

The die 53 is in fixed relation to the base 29. The base 29 includes a bore 60 (passing therethrough) which is aligned with the bore 41 through the keeper block 31 and the bore 59 through the die 53, in order to provide the apparatus 21 with means for removal of the slug 49.

The nut guide 35 preferably includes at least two interconnecting passageways 61, 63 (FIGS. 1, 3, 4, 14 and 15); the first passageway 61 is laterally disposed toward the second passageway 63.

A punch 65 and a stripper 67 (FIGS. 1–7) are advanceable by a ram 69 (FIGS. 1, 2) toward the upper surface 55 of the die 53. FIG. 13 presents another embodiment of such a stripper 67A and a second embodiment of such a ram 69A, in accordance with the present invention.

The punch 65 includes a punch head 71 (FIGS. 1, 2), a punch body 73 (FIGS. 1, 2), and a punch tip 77 (FIGS. 1, 3–7 and 13). Two preferred embodiments of the punch body 73 are presented in FIGS. 10, 11. One preferred embodiment of the punch body is referred to as 73A. Another preferred embodiment of the punch body is referred to as 73B. A punch element 75 is axially disposable within either punch body 73A or 73B. The preferred punch tip 77A, presented in FIG. 12, includes three concentric steps 79, 81 and 83. The third step 79 has the largest diameter of the three steps 79, 81 and 83, and is integral with the punch element 75 and the second step 81. The second step 81 has a diameter which is greater than the diameter of the first step 83 with which it is integral.

Referring to FIGS. 1–4, it will be seen that the panel 27, supported upon the upper surface 85 of the nut guide 35, is interposed between the die 53 and the punch 65. It will further be seen, by referring to FIG. 1, that when the apparatus 21 is in an initial or "starting" position, a gap 87 exists between the stripper 67 or 67A (see FIGS. 1, 3 or 13) and the panel 27.

The apparatus 21 includes the ram 69 or 69A (FIGS. 1, 2 or 13). It can be appreciated that the ram 69 or 69A can be operated hydraulically, mechanically, electrically or otherwise to advance the punch 65 and the stripper 67 or 67A toward the die 53.

As the ram 69 moves downwardly (FIGS. 1, 2) urging the punch head 71 toward the die 53, the punch 65 and stripper 67 initially move downwardly, as a unit, toward the die 53. The stripper 67, upon making contact with the panel 27, urges the nut guide 35 downwardly (FIG. 4) in the direction of the base 29 of the apparatus 21.

In the first embodiment (FIGS. 1, 2), the punch 65 is spring biased within the stripper 67 in a known manner by a spring clip 89, a washer 91 and a spring 93. In the second embodiment (FIG. 13), the punch 65 is spring biased away from the stripper 67A in a known manner using the two springs 93A (which are a second embodiment of the single spring 93) and respective rods 94.

The die 53 is disposable within the second passageway 63 of the nut guide 35 (FIGS. 1, 2); and downward movement of the nut guide 35, relative to the base 29, advances the die 53, disposed within the second passageway 63, upwardly through the second passageway 63 relative to the downwardly moving nut guide 35 (FIG. 4). When the apparatus 21 is in the starting position (FIG. 1), the linear arrangement of attached nuts 23A–23D is fed intermittently, in a known manner, through the first passageway 61 of the nut guide 35 so that the lead nut 23A is stopped in position upon the upper surface 55 of the die 53.

The first passageway 61 includes flares 95 (FIGS. 1, 2 and 15), above and below (at least one of the attached nuts 23) to facilitate insertion of the lead nut 23A into the nut guide 35. Otherwise, the height dimension of the first nut guide cavity 61 is slightly greater than the height dimension of an individual nut 23. The width dimension of the first nut guide cavity 61 is great enough to freely accommodate an individual nut 23 (FIG. 19).

Contact of the panel 27 by the stripper 67, and subsequent downward movement of the panel 27, nut guide 35, punch 65 and stripper 67 (all relative to the die 53) causes the lead nut 23A to be severed from the remainder of the linear arrangement of nuts 23B, 23C (see FIGS. 3, 4).

A first gap 97, between the punch head 71 and the stripper 67, is preferably the same dimension as a second gap 99, between the punch 65 (excluding the punch tip 77) and the lower surface 101 of the stripper 67 (FIGS. 1, 3-5), so that the punch head 71 bottoms out against the stripper 67 at the same time that the punch 65 bottoms out against the die 53 (FIGS. 2 and 7). In the second embodiment of the stripper 67A (FIG. 13), the first gap 97 is measured between a lower edge of the second embodiment of the ram 69A and an upper surface of the stripper 67A.

The individual spring 93 of the first embodiment of the stripper 67 (FIG. 1), or the two springs 93A of the second embodiment of the stripper 67A (FIG. 13), is substantially stiffer than the two springs 45 which bias the nut guide 35 away from the keeper block 31. Accordingly, as the ram 69 of the first embodiment (FIGS. 1, 2) or the ram 69A of the second embodiment (FIG. 13) causes the punch 65 and stripper 67 of the first embodiment (FIGS. 1, 2) or the stripper 67A of the second embodiment (FIG. 13) to move downwardly as a punch-and-stripper unit toward the die 53, the initial dimensions of the first gap 97 (i.e., the dimension measured when the apparatus 21 is in the starting position, FIG. 1) and the second gap 99 are maintained until the lead nut 23A makes contact with the underside 25 of the panel 27 (FIG. 5).

With the punch tip 77 oriented toward the hole 24 of the lead nut 23A (FIG. 5), further downward advancement of the first embodiment of the ram 69 (FIGS. 1, 2) or the second embodiment of the ram 69A (FIG. 13) toward the die 53 causes the punch 65 to move downwardly toward the die 53 relative to the first embodiment of the stripper 67 (FIGS. 1, 2) or the second embodiment of the stripper 67A (FIG. 13), either of which is in fixed relation to the die 53. The punch tip 77 thereby pierces the panel 27, producing the slug 49 (FIG. 6) which falls downwardly through the bores 59, 41 and 60 (and out of the apparatus 21). Insertion of the punch tip 77 into the nut hole 24 draws portions 103 of the panel 27 into the hole 24 of the lead nut 23A (FIGS. 6-8).

For purposes of the present invention, the preferred clinch nut 23 is U-shaped (when viewed on edge, FIG. 19). A gap 105 which exists between leg portions 107, 109 of the nut 23 or 23A (FIGS. 3-6, 19) is generally perpendicularly disposed to the axis of the hole 24. The hole 24 includes at least four concentric steps 111, 112, 113 and 115, each having different diameters (FIGS. 3-5). The first step 111, which is nearest to the punch 65, is substantially cylindrical and has a diameter which is less than the diameter of the third step 113 which is also substantially cylindrical. The second step 112 is substantially conical, is adjacent to the first step 111 and has a variable diameter which is initially substantially the same as the diameter of the first step 111 where the first step 111 borders the second step 112. The diameter of the second step 112 increases progressively axially through the hole 24 in the direction of the die 53. The first and second steps 111, 112 include a plurality of axially oriented surface projections or teeth 117 (although only one such tooth 117 is shown in FIGS. 3-5 to present clearly the details of the steps 111, 112, 113, 115 of the hole 24) which are integral with the inner surfaces of the first and second steps 111 and 112 and which extend radially inwardly from portions of the inner peripheries thereof (FIGS. 3-5). The teeth 117 are preferably equally spaced about the inner peripheries of the first and second steps 111, 112 of the hole 24. The circumferentially directed width dimension of an interstice or gap between any two adjacent teeth 117 is preferably greater than the circumferentially directed width dimension of an individual tooth 117. There are preferably four such teeth 117 (details not shown).

The first and second steps 111 and 112 are in the upper leg portion 107 of the nut 23A. The fourth and third steps 115, 113 of the hole 24 are in the lower leg 109. The gap 105 serves as a discontinuity or void between the first and second steps 111, 112 and the third and fourth steps 113, 115. The portions 103 of the panel 27 are initially urged or drawn into the first and second steps 111, 112 and into the gap 105, by the punch tip 77 (FIG. 6). The portions 103 are ultimately secured to the nut 23A by the cooperation between the punch 65 and the die 53 (FIG. 7).

The fourth step 115 is substantially cylindrical. The diameter of the third step 113 is substantially greater than the largest diameter of the conical second step 112. The smallest diameter of the hole 24 is the diameter of the fourth step 115 which is preferably slightly greater than the diameter dimension of the third step 79 of the preferred punch tip 77A (FIG. 12).

The structure of the preferred clinch nut 23A further includes an annular pad 119 (FIGS. 3-6), which extends radially outwardly from a peripheral portion of the fourth step 115 and is integral with the lower leg 109. The annular pad 119 depends axially from the lower leg 109 and preferably supports the nut 23A upon the die 53. Axial extension of the annular pad 119 is substantially the same as the depth dimension of the third step 113 of the hole 24. The inner diameter of the annular pad 119 is substantially the same as the diameter dimension of the third step 113 of the hole 24.

FIGS. 16-18 present formation of the clinch nut 23, preferably usable with the apparatus 21 of the present invention. A sheet of metal of appropriate thickness is slotted and oriented about a bend line 141 (FIG. 16). Before holes are formed in the individual nuts 23, the legs 107 and 109 are formed, the nuts 23 straddling the bend line 141 (FIG. 17), and a linear arrangement of attached nuts 23 is eventually formed (FIG. 18). The nuts 23 can then individually have the holes 24 formed through the legs 107, 109 (FIG. 19), as above described or otherwise as desired. Or, desired holes could be formed prior to bending.

Referring to FIGS. 3-7, it will be seen that when the severed lead nut 23A makes contact with the panel 27, the ram 69 or 69A (FIG. 13) causes the punch tip 77 to move downwardly through the nut hole 24, relative to the stripper 67 or 67A, compressing the stripper springs 93 (FIGS. 1, 2) or 93A, forcing the panel portions 103 into the nut hole 24 (FIG. 6) and eventually causing the severed lead nut 23A to become compressed or otherwise elastically deform (FIG. 7) as the punch head 71 contacts the stripper 67 and the punch 65 contacts the upper surface of the panel 27 (FIG. 2).

The drawing of the portions 103 of the panel 27 into the nut hole 24 (FIG. 6) and between the teeth 117 (detail not shown), and the collapsing or deforming of the lead nut 23A (FIG. 7) ensures substantial nonrotatable securement of the lead nut 23A to the panel 27. After the nut 23A has been secured to the panel 27, the punch 65 is caused to move upwardly by the ram 69 or 69A drawing the punch tip 77 upwardly and out of the nut hole 24 (FIG. 8) and back to the starting position (FIG. 1). While the punch 65 is moving toward the starting position (or when or after the punch 65 has arrived at the starting position), the panel 27 and secured nut 23A (FIG. 8) can be lifted out of the second passageway 63 of the nut guide 35, as desired.

Thereafter, the secured nut 23A and panel 27, together, if desired, can be threaded and secured by a bolt 121 to a portion 122 (FIG. 9) of a fixed surface or to a movable structure.

With the apparatus 21 back in the starting position, the next lead nut 23B in the linear arrangement of nuts 23B-23D is advanced in a known manner through the first passageway 61 of the nut guide 35 and onto the upper surface 55 of the die 53 so that the above-described procedure for securing the nut 23B to the panel 27 to produce a clinch nut can be repeated.

The preferred embodiment of the nut guide 35 includes a removable plate 123, secured by metal screws 125 to the upper surface 85 of the nut guide 35. The plate 123 forms a portion of the first passageway 61 (FIGS. 14, 15). FIG. 10 presents one preferred embodiment of the punch 65 including the punch element 75 axially disposed within a cavity of the first embodiment of the punch body 73A and secured by a laterally disposed set screw 127 to the punch body 73A. The punch element 75 is relatively slightly advanceable or retractable, relative to the punch body 73A, by means of two set screws 128 screwed into the cavity of the punch body 73A opposite the punch element tip 77.

FIG. 11 presents the other preferred embodiment of the punch 65 including the punch element 75 axially disposed within a cavity of the second embodiment of the punch body 73B and secured by another laterally disposed set screw 129 to the punch body 73B. The punch element 75 is relatively slightly advanceable or retractable, relative to the punch body 73B, by means of a plurality of shims 131 (four are shown) interposed between a base of the cavity of the punch body 73B and the end of the punch element 75 opposite the punch element tip 77.

What has been illustrated and described herein is an apparatus for severing a nut from a linear arrangement of attached nuts and for securing such a severed nut to carrier material, in a one-step procedure. While the apparatus of the invention has been illustrated and described with reference to preferred embodiments, the invention is not limited thereto. On the contrary, alternatives, changes or modifications may become apparent to those skilled in the art upon reading the foregoing descriptions. Accordingly, such alternatives, changes or modifications are to be considered as forming a part of the invention insofar as they fall within the spirit and scope of the appended claims.

I claim:

1. An apparatus for severing a lead nut having a hole therethrough from a linear arrangement of like attached nuts and for securing such a severed nut to carrier material comprising: linear arrangement support means for supporting said linear arrangement of attached nuts, including separate lead nut support means for supporting said lead nut; and means for moving said linear arrangement support means relative to said lead nut support means thereby severing said lead nut from the remainder of said linear arrangement of attached nuts and for drawing portions of said carrier material into said hole of said severed nut thereby securing said severed lead nut to said carrier material, means for advancing a punch toward said lead nut along a path, said punch having a tip oriented toward said hole of said lead nut, said carrier material being interposed between said punch and said lead nut; and, means for causing said punch tip to puncture said carrier material, said linear arrangement support means including a block of metal having first and second interconnecting passageways, said first passageway being oriented transverse to said path, said second passageway being oriented along said path, said linear arrangement of attached nuts being advanceable through said first passageway, inner surfaces of said first passageway being adapted to engage upper portions of said attached nuts carried therein; said separate lead nut support means includes a die insertable into said second passageway, said die having a cavity oriented along said path, said lead nut being advanceable through said first passageway and into said second passageway intermediate said punch and said die; and, said means for moving said linear arrangement support means relative to said lead nut support means and for drawing portions of said carrier material into said hole of said severed nut including a ram, a stripper and a fixed base which carries said die, said block of metal being biased away from said fixed base, said punch being biasly disposed within said stripper, said ram being adapted to advance said punch and said stripper along said path, to urge said stripper against said carrier material, to urge said block of metal along said path toward said base and to urge said inner surfaces of said first passageway against said upper portions of said attached nuts, portions of said inner surfaces of said first passageway adapted to engage edge portions of said lead nut and to sever said lead nut from the remainder of said attached nuts, said tip of said punch having three axially concentric cylindrical steps progressively decreasing to diameter away from said punch, whereupon when said ram is caused to urge said punch against said die said metal block severs said lead nut from said remainder of attached nuts, said punch tip punctures said carrier material and draws said portions thereof into said nut hole and said punch and said die cooperate to deform said lead nut supported therebetween thereby securing said lead nut to said carrier material.

2. An apparatus for severing a lead nut having a hole therethrough from an arrangement of like attached nuts, for puncturing carrier material and for securing said lead nut severed from the remainder of said attached nuts to said carrier material proximate to where so punctured comprising: support means for supporting said attached nuts, including separate lead nut support means for supporting said lead nut; and, means for advancing a punch biasly disposed within a stripper toward said lead nut along a path, said punch and said stripper being advanceable and retractable along said path by a ram, said punch having a tip oriented toward said hole of said lead nut, said carrier material being interposed between said punch and said lead nut and being supported upon an upper surface of said support means, said support means including a block having first and second interconnecting passageways, said first passageway being oriented transverse to said path, said second passageway being oriented substantially along said path, said arrangement of attached nuts being advanceable through said first passageway, inner surfaces of said first passageway being adapted to engage upper portions of said attached nuts carried therein, said lead nut support means including a die insertable into said second passageway, a fixed base carrying said die, said block being biased away from said base, said die having a cavity oriented substantially along said path and adapted to accept said punch tip inserted therein, said lead nut being advanceable through said first passageway and into said second passageway intermediate said carrier material and said die, said ram being adapted to urge said stripper against said carrier material, to urge said block toward said base relative to said die thereby urging said inner surfaces of said first passageway against said upper portions of said attached nuts and severing said lead nut from the remainder of said attached nuts, whereupon when said ram advances said punch toward said die said stripper engages said carrier material and urges said block toward said base thereby severing said lead nut from said remainder of attached nuts, said punch tip punctures said portion of said carrier material drawing portions thereof into said nut hole and said punch urges said lead nut against said die causing said lead nut to deform, such deformation causing said portions of said carrier material to be drawn radially away from said nut hole thereby securing to said lead nut said portions of said carrier material drawn into said nut hole.

3. The apparatus of claim 2 wherein said punch tip has three axially concentric cylindrical steps progressively decreasing in diameter away from said punch.

4. The apparatus of claim 1 or claim 3 including means for retracting said lead nut, such retraction being along said path.

5. The apparatus of claim 4 including means for advancing said arrangement of attached nuts toward said path and for causing said lead nut to be advanced onto said lead nut support means.

6. The apparatus of claim 5 wherein said carrier material is a sheet metal panel.

* * * * *